(12) United States Patent
Gouko et al.

(10) Patent No.: US 10,782,194 B2
(45) Date of Patent: Sep. 22, 2020

(54) HEATER PLATE, APPARATUS FOR MANUFACTURING HEAT FLUX SENSOR USING THE HEATER PLATE, METHOD OF MANUFACTURING THE HEATER PLATE AND APPARATUS FOR MANUFACTURING THE HEATER PLATE

(71) Applicant: DENSO CORPORATION, Kariya, Aichi-pref. (JP)

(72) Inventors: Norio Gouko, Kariya (JP); Atusi Sakaida, Kariya (JP); Toshihisa Taniguchi, Kariya (JP); Keiji Okamoto, Kariya (JP); Yoshihiko Shiraishi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 295 days.

(21) Appl. No.: 15/779,888

(22) PCT Filed: Nov. 29, 2016

(86) PCT No.: PCT/JP2016/085390
§ 371 (c)(1),
(2) Date: May 30, 2018

(87) PCT Pub. No.: WO2017/094714
PCT Pub. Date: Jun. 8, 2017

(65) Prior Publication Data
US 2018/0372561 A1    Dec. 27, 2018

(30) Foreign Application Priority Data

Nov. 30, 2015    (JP) .................................. 2015-233840

(51) Int. Cl.
*G01K 17/00*    (2006.01)
*G01K 7/00*    (2006.01)
(Continued)

(52) U.S. Cl.
CPC ................ *G01K 17/20* (2013.01); *G01J 5/12* (2013.01); *G01K 1/14* (2013.01); *G01K 19/00* (2013.01);
(Continued)

(58) Field of Classification Search
USPC .................................. 374/29, 141, 163, 208
See application file for complete search history.

(56) References Cited

U.S. PATENT DOCUMENTS 3,895,216 A * 7/1975 Hurko .................. F24C 15/104
219/458.1
2005/0205766 A1   9/2005 Sawada
(Continued)

FOREIGN PATENT DOCUMENTS

DE       19516480 C1    9/1996
EP       2858134 A1     4/2015
(Continued)

*Primary Examiner* — Mirellys Jagan
(74) *Attorney, Agent, or Firm* — Harness, Dickey & Pierce, P.L.C.

(57) ABSTRACT

A heater plate includes a sheet-like heating member that generates heat upon being energized, a protective film provided on the side of one major surface of the sheet-like heating member to protect the sheet-like heating member, an output circuit section provided on a surface of the protective film on the opposite side to the sheet-like heating member, and a protruding portion forming film provided between the protective film and the sheet-like heating member. The output circuit section has protruding portions formed to be capable of respectively abutting terminals of a heat flux sensor which is an inspection object. The protruding portion forming film has protrusions at positions corresponding to the protruding portions. The sheet-like heating member, the protective film, the output circuit section and the protruding portion forming film are integrally formed into one piece.

9 Claims, 10 Drawing Sheets

(51) Int. Cl.
*G01K 1/00* (2006.01)
*G01K 17/20* (2006.01)
*G01K 19/00* (2006.01)
*H05B 3/36* (2006.01)
*G01J 5/12* (2006.01)
*G01K 1/14* (2006.01)
*G01N 25/18* (2006.01)
*H05B 3/02* (2006.01)
*H05B 3/20* (2006.01)

(52) U.S. Cl.
CPC ............ *G01N 25/18* (2013.01); *H05B 3/02* (2013.01); *H05B 3/20* (2013.01); *H05B 3/36* (2013.01)

(56) References Cited

U.S. PATENT DOCUMENTS

| | | |
|---|---|---|
| 2006/0049840 A1 | 3/2006 | Ito et al. |
| 2006/0113355 A1* | 6/2006 | Onouchi ............... B23K 1/203 228/101 |
| 2007/0181650 A1 | 8/2007 | Yoo et al. |
| 2010/0158069 A1 | 6/2010 | Yoo et al. |
| 2011/0052284 A1* | 3/2011 | Yonekawa ......... G03G 15/2053 399/333 |
| 2011/0092072 A1* | 4/2011 | Singh ..................... H05B 3/00 438/710 |
| 2013/0220989 A1* | 8/2013 | Pease ................... H01L 21/6831 219/458.1 |
| 2014/0204975 A1* | 7/2014 | Kosakai ............... H05B 1/0233 374/179 |
| 2016/0125671 A1 | 5/2016 | Tanaka et al. |
| 2017/0208649 A1* | 7/2017 | Tabushi ................... H05B 3/06 |
| 2017/0345668 A1* | 11/2017 | Takebayashi ....... H01L 21/3065 |
| 2018/0143087 A1 | 5/2018 | Gouko et al. |

FOREIGN PATENT DOCUMENTS

| | | |
|---|---|---|
| JP | A 2005337739 | 12/2005 |
| JP | A 2007208262 | 8/2007 |
| JP | 2011-174851 A | 9/2011 |
| JP | A 2016211991 | 12/2016 |
| WO | WO-2014/196294 A1 | 12/2014 |

* cited by examiner

HEATER PLATE, APPARATUS FOR MANUFACTURING HEAT FLUX SENSOR USING THE HEATER PLATE, METHOD OF MANUFACTURING THE HEATER PLATE AND APPARATUS FOR MANUFACTURING THE HEATER PLATE

CROSS REFERENCE TO RELATED APPLICATIONS

This application is a U.S. National Phase Application under 35 U.S.C. 371 of International Application No. PCT/JP2016/085390 filed on Nov. 29, 2016 and published in Japanese as WO 2017/094714 A1 on Jun. 8, 2017. This application is based on and claims the benefit of priority from Japanese Patent Application No. 2015-233840 filed on Nov. 30, 2015. The entire disclosures of all of the above applications are incorporated herein by reference.

TECHNICAL FIELD

The present invention relates to a heater plate, an apparatus for manufacturing a heat flux sensor using the heater plate, a method of manufacturing the heater plate and an apparatus for manufacturing the heater plate; the heater plate is capable of, while heating a sheet-like inspection object that has a plurality of terminals capable of outputting a signal, externally outputting the signal outputted by the terminals.

BACKGROUND ART

Conventionally, there have been known heat flux sensors that measure heat flux which is defined as the quantity of heat crossing per unit area per unit time from one side to the other side. For example, in Patent Document 1, there is described a heat flux sensor that includes: a plate-like substrate having a plurality of via holes; and output circuit sections respectively on two major surfaces of the substrate which are electrically connected via electrically-conductive layers formed in the via holes and output voltages generated according to the magnitude of the heat quantity flowing from one side to the other side of the substrate.

PRIOR ART LITERATURE

Patent Literature

[PATENT DOCUMENT 1] Japanese Patent Application Publication No. JP2007208262A

SUMMARY OF THE INVENTION

Problems to be Solved by the Invention

In the heat flux sensor described in Patent Document 1, a plurality of output circuit sections, which output signals of the heat flux sensor, are provided on a plate-like member that is obtained by laminating a soft film of a polyimide or the like constituting the substrate and an insulating layer formed of a solder resist or the like. Therefore, in inspecting the characteristics of the heat flux sensor during the manufacture of the heat flux sensor described in Patent Document 1, it is necessary to accurately measure the voltages respectively outputted by the plurality of output circuit sections while causing a heat flow of a predetermined magnitude to flow from one side to the other side of the heat flux sensor.

In causing a predetermined quantity of heat to flow through the heat flux sensor, a heater for heating is provided on one side of the heat flux sensor while a cooling section is provided on the other side of the heat flux sensor. Consequently, a heat flow is formed which flows from the one side to the other side of the heat flux sensor. At this time, the characteristics of the heat flux sensor are inspected based on the relationship between the voltages outputted by the heat flux sensor, which is sandwiched between the heater and the cooling section, and the magnitude of the heat quantity flowing through the heat flux sensor. The magnitude of the heat quantity flowing through the heat flux sensor can be calculated based on the electric power supplied to the heater. However, heat generated by the heater not only flows to the cooling section, but also diffuses in every direction as viewed from the heater. Therefore, it is difficult to accurately determine the magnitude of the heat quantity actually passing through the heat flux sensor.

Accordingly, one may consider inspecting the characteristics of the heat flux sensor with the heater formed as thin as possible into a sheet-like shape so that diffusion of the heat is negligible in directions other than both the direction toward the cooling section and the direction toward the opposite side to the cooling section as viewed from the heater.

At this time, to ensure thermal insulation while improving the adherence between the heater and the heat flux sensor, a support made of an elastic material may be provided on the opposite side of the heater to the cooling section. However, when external inspection probes are pressed on the output circuit sections during inspection of the characteristics of the heat flux sensor, the support may be bent by the pressing force, forming a gap between the heater and the heat flux sensor. Consequently, it may become impossible to have the heater and the heat flux sensor sufficiently adhered to each other.

Moreover, in the case where the plurality of output circuit sections are provided on the single substrate as in the heat flux sensor described in Patent Document 1, the amount of bending of the support would be large and thus the adherence between the heater and the heat flux sensor would be further deteriorated since the plurality of inspection probes are respectively pressed on the plurality of output circuit sections. Consequently, it would become impossible to accurately determine the quantity of heat flowing through the heat flux sensor, thus lowering the inspection accuracy.

The present invention has been made in view of the above problems. It is therefore an object of the present invention to provide a heater plate capable of, while accurately heating an inspection object having terminals capable of outputting a signal and thereby causing a predetermined quantity of heat to flow through the inspection object, reliably externally outputting the signal outputted by the terminals.

Means for Solving the Problems

A heater plate according to the present invention is capable of, while heating a sheet-like inspection object that has terminals capable of outputting a signal, outputting to an external device or an external circuit the signal outputted by the terminals. The heater plate includes a sheet-like heating member, a protective film, an output circuit section and a protruding portion forming film.

The sheet-like heating member generates heat upon being energized.

The protective film is provided on the side of one major surface of the sheet-like heating member to protect the sheet-like heating member.

The output circuit section is provided on a surface of the protective film on the opposite side to the sheet-like heating member. The output circuit section has protruding portions and external output portions. The protruding portions protrude in a direction opposite to the sheet-like heating member so as to be capable of abutting the terminals respectively. The external output portions are respectively electrically connected with the protruding portions and capable of externally outputting the signal that is inputted to the protruding portions.

The protruding portion forming film is provided between the protective film and the sheet-like heating member. The protruding portion forming film has protrusions formed at positions corresponding to the protruding portions.

The sheet-like heating member, the protective film, the output circuit section and the protruding portion forming film are integrally formed into one piece.

In the heater plate according to the present invention, the protruding portion forming film, which is provided between the protective film and the sheet-like heating member, has the protrusions formed at the positions corresponding to the protruding portions of the output circuit section. Consequently, those portions of the protective film and those portions of the output circuit section which correspond to the positions of the protrusions protrude along the shape of the protrusions in the direction opposite to the sheet-like heating member, forming the protruding portions of the output circuit section. The protruding portions of the output circuit section can be formed into a desired shape by forming the protrusions into a desired shape; therefore, it is possible to reliably make electrical connection between the terminals of the inspection object and the protruding portions while adhering the heater plate to the inspection object and thereby reliably transferring the heat generated by the heating element to the inspection object. Accordingly, the heater plate according to the present invention can reliably externally output the signal outputted by the terminals while supplying a predetermined quantity of heat to the inspection object.

EMBODIMENTS FOR CARRYING OUT THE INVENTION

Hereinafter, embodiments of the present invention will be described with reference to the drawings.

One Embodiment

A heater plate according to one embodiment of the present invention, an apparatus for manufacturing a heat flux sensor using the heater plate, a method of manufacturing the heater plate and an apparatus for manufacturing the heater plate will be described with reference to FIGS. 1-12.

Figure 2:
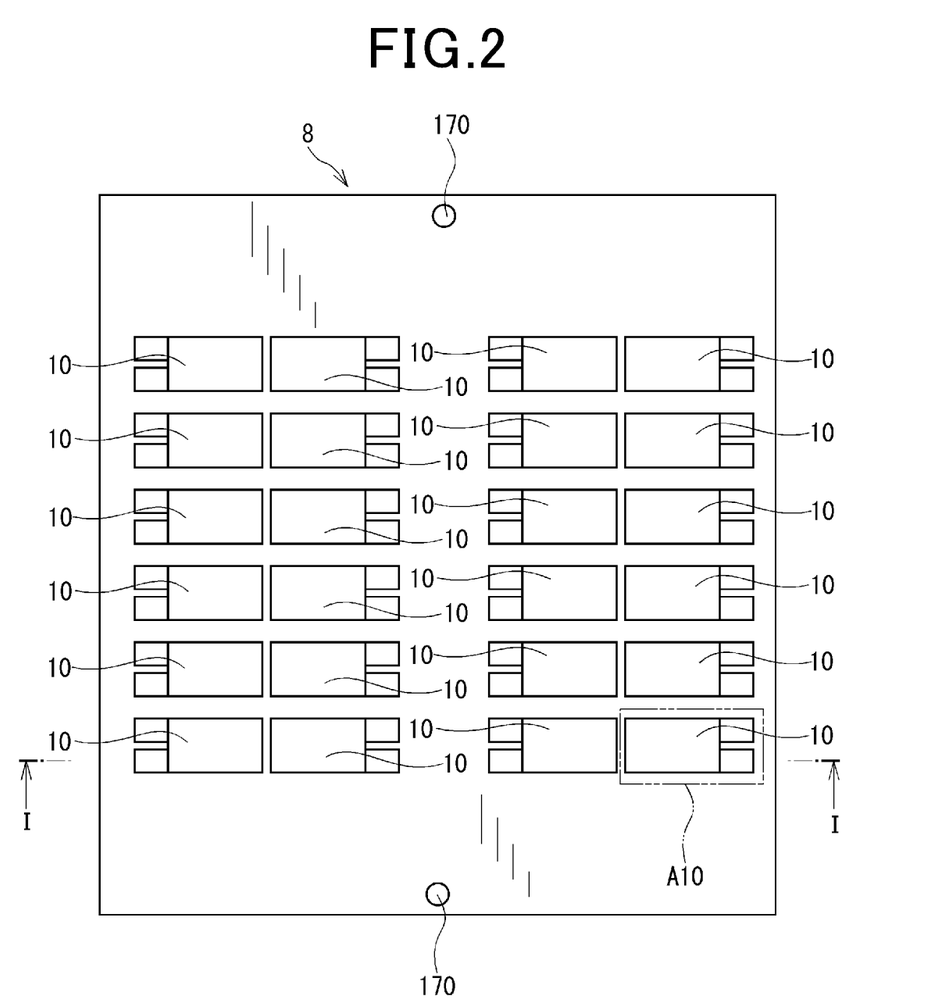
FIG. 2 is a schematic view of a heat flux sensor sheet which is an inspection object of the inspection apparatus according to the embodiment of the present invention.

First, heat flux sensors, which correspond to "inspection objects", will be described with reference to FIGS. 2-4. A heat flux sensor 10 is a sensor capable of detecting heat flux which is defined as the quantity of heat crossing per unit area per unit time. The heat flux sensor 10 outputs the detected heat flux in the form of, for example, a voltage. As shown in FIG. 4, the heat flux sensor 10 is constituted of an insulating substrate 11, a back protective member 12, a front protective member 13, a plurality of first inter-layer connecting members 14 and a plurality of second inter-layer connecting members 15. In the present embodiment, as shown in FIG. 2, a plurality of heat flux sensors 10 are formed together in a single sheet (hereinafter, to be referred to as "sensor sheet 8"). An inspection apparatus 1 for heat flux sensors, which corresponds to a "manufacturing apparatus for heat flux sensors", is capable of measuring at the same time the characteristics of the plurality of heat flux sensors 10 formed in the sensor sheet 8 during the manufacture of the heat flux sensors 10. Here, the configuration of one heat flux sensor 10 (the heat flux sensor 10 included in a region A10 of FIG. 2) will be described. It should be noted that all of the plurality of heat flux sensors 10 formed in the sensor sheet 8 shown in FIG. 2 have the same configuration. In addition, in FIG. 4, for facilitating understanding of the configuration of the heat flux sensor 10, the aspect ratio is changed in comparison with the actual shape.

The insulating substrate 11 is formed of a film of thermoplastic resin. The insulating substrate 11 has a plurality of via holes 111 penetrating it in its thickness direction. In each of the via holes 111, there is provided either one of the first inter-layer connecting members 14 or one of the second inter-layer connecting members 15. Next to each of the via holes 111 in which the first inter-layer connecting members 14 are respectively provided, there is arranged one of the via holes 111 in which the second inter-layer connecting members 15 are respectively provided. That is, in the insulating substrate 11, the first inter-layer connecting members 14 are arranged alternately with the second inter-layer connecting members 15.

The back protective member 12 is formed of a film of thermoplastic resin and arranged on a back surface 112 of the insulating substrate 11. The back protective member 12 is formed into the same size as the insulating substrate 11. Moreover, on a surface 121 of the back protective member 12 on the insulating substrate 11 side, there is formed a plurality of back patterns 114 by patterning copper foil or the like. The back patterns 114 electrically connect the first inter-layer connecting members 14 and the second inter-layer connecting members 15 on the back protective member 12 side.

The front protective member 13 is formed of a film of thermoplastic resin and arranged on a front surface 113 of the insulating substrate 11. The front protective member 13 is formed into the same size as the insulating substrate 11. Moreover, on a surface 131 of the front protective member 13 on the insulating substrate 11 side, there is formed a plurality of front patterns 115 by patterning copper foil or the like. The front patterns 115 electrically connect the first inter-layer connecting members 14 and the second inter-layer connecting members 15 on the front protective member 13 side.

The first inter-layer connecting members 14 and the second inter-layer connecting members 15 are formed of different metals to exhibit the Seebeck effect. For example, the first inter-layer connecting members 14 are formed of a metal compound; the metal compound is obtained by solid-phase sintering powder of a Bi—Sb—Te alloy for constituting a P-type semiconductor so as to maintain the crystal structure of a plurality of metal atoms before the sintering. Moreover, the second inter-layer connecting members 15 are formed of a metal compound; the metal compound is obtained by solid-phase sintering powder of a Bi—Te alloy for constituting an N-type semiconductor so as to maintain the given crystal structure of a plurality of metal atoms before the sintering. The first inter-layer connecting members 14 and the second inter-layer connecting members 15 are alternately and serially connected by the back patterns 114 and the front patterns 115.

Figure 3:
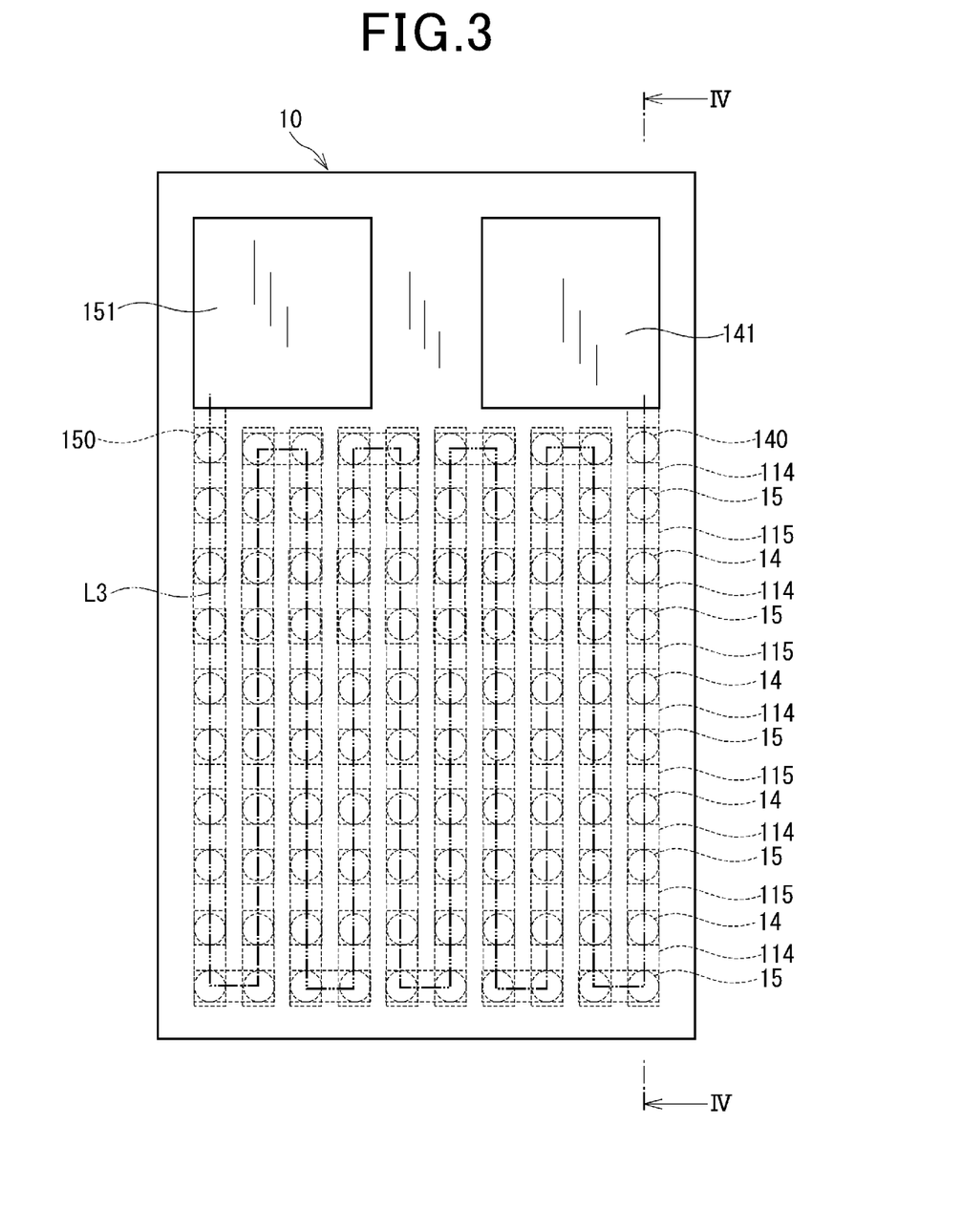
FIG. 3 is a schematic view of a heat flux sensor to be inspected by the inspection apparatus according to the embodiment of the present invention.
Figure 4:
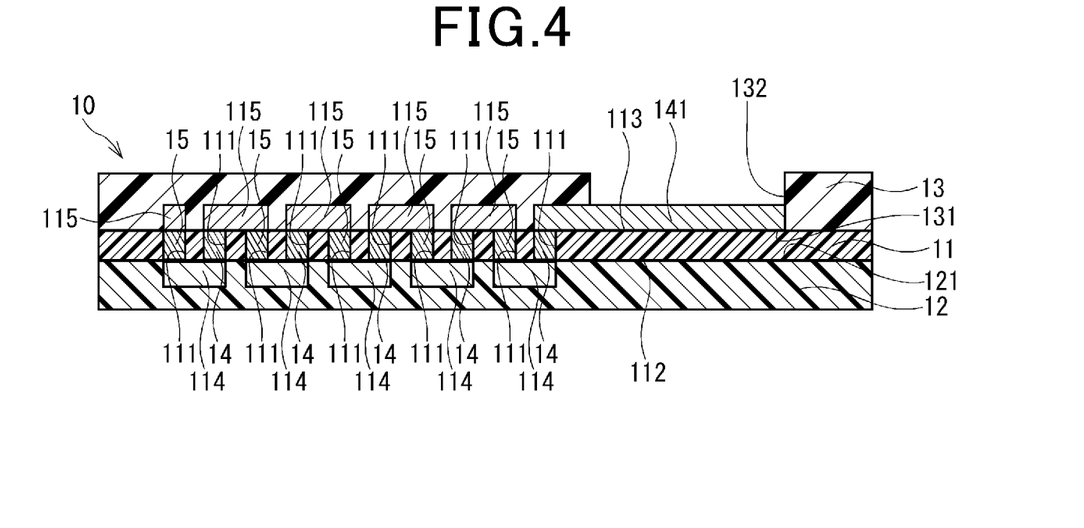
FIG. 4 is a cross-sectional view taken along the line IV-IV in FIG. 3.

As shown in FIG. 3, of the plurality of first inter-layer connecting members 14, one first inter-layer connecting member 140 is electrically connected to a terminal 141. Moreover, of the plurality of second inter-layer connecting members 15, one second inter-layer connecting member 150 is electrically connected to a terminal 151. As shown in FIG. 3, the terminals 141 and 151 are respectively located at two ends of a circuit that is formed by connecting the back patterns 114, the first inter-layer connecting members 14, the front patterns 115 and the second inter-layer connecting members 15 in the heat flux sensor 10 in a meandering manner (see the two-dot chain line L3 in FIG. 3). Moreover, the terminals 141 and 151 are exposed to the outside via an opening 132 of the front protective member 13. Consequently, the terminals 141 and 151 can be brought into contact with protruding portions 251 of a heater plate 20 which the inspection apparatus 1 includes as will be described later.

In the present embodiment, in the sensor sheet 8, there are formed 24 heat flux sensors 10. Moreover, as shown in FIG. 2, in the sensor sheet 8, the terminals 141 and 151 are formed so as to be arranged in four rows; in each row, there are included six pairs of the terminals 141 and 151. Furthermore, the sensor sheet 8 has positioning holes 170 formed at positions corresponding to positioning pins of the heater plate which will be described later.

In each of the heat flux sensors 10, when the magnitude of the heat quantity flowing in the thickness direction of the heat flux sensor 10 (the vertical direction in FIG. 4) changes, the voltage generated at the alternately-and-serially-connected first and second inter-layer connecting members 14 and 15 also changes. Each of the heat flux sensors 10 outputs the voltage as an inspection signal; based on the inspection signal, the heat flux transferred to the heat flux sensor 10 is measured.

Figure 1:
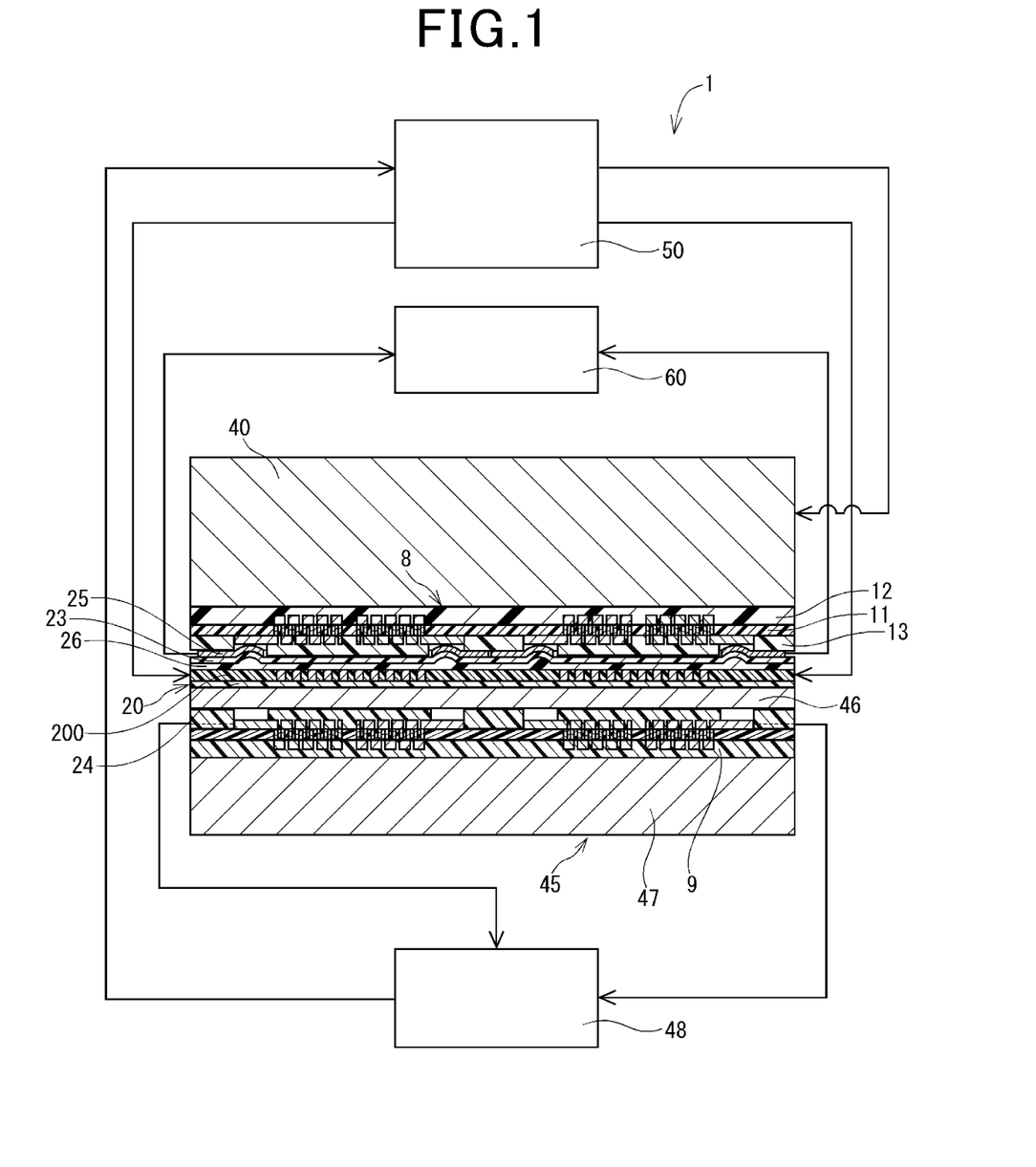
FIG. 1 is a schematic view of an inspection apparatus for heat flux sensors according to one embodiment of the present invention.

Next, the configuration of the inspection apparatus 1 will be described. As shown in FIG. 1, the inspection apparatus 1 is constituted of the heater plate 20, a cooling section 40 which corresponds to a "temperature regulating section", a temperature detecting section 45, a temperature controlling section 50 and a characteristic measuring section 60.

Figure 6:
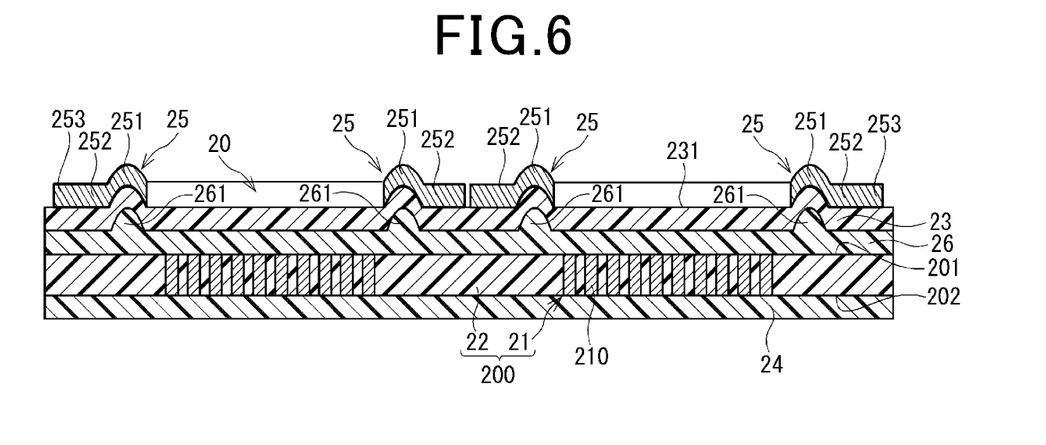
FIG. 6 is a cross-sectional view taken along the line VI-VI in FIG. 5.
Figure 7:
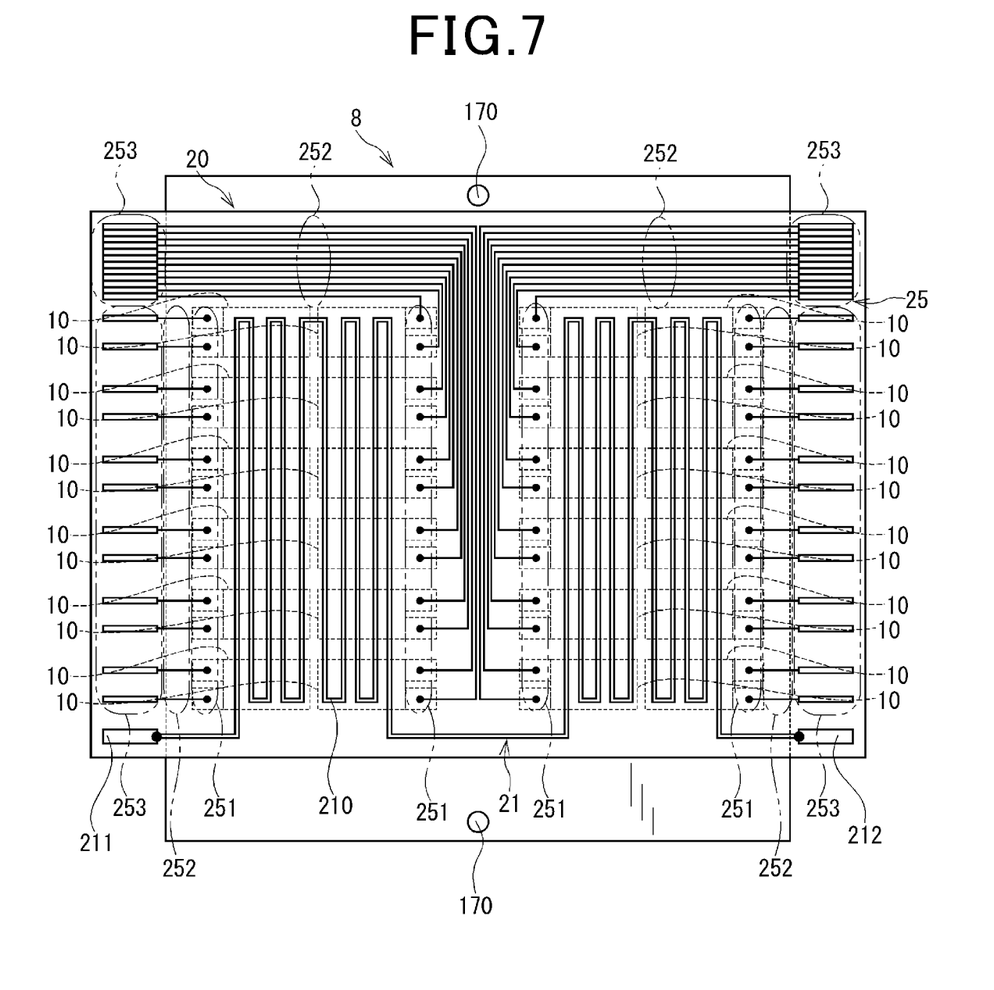
FIG. 7 is a schematic view of the heater plate and the sensor sheet according to the embodiment of the present invention in a superposed state.

The heater plate 20 is provided so as to be able to abut the heat flux sensors 10. Specifically, the heater plate 20 is provided on the temperature detecting section 45 side of the heat flux sensors 10 that are set in the inspection apparatus 1. As shown in FIG. 6, the heater plate 20 is constituted of a heating element 21, insulating portions 22, protective films 23 and 24, an output circuit section 25 and a protruding portion forming film 26. The heating element 21, the insulating portions 22, the protective films 23 and 24, the output circuit section 25 and the protruding portion forming film 26 are integrally formed into one piece. In addition, in FIG. 6, for facilitating understanding of the configuration of the heater plate 20, the aspect ratio is changed in comparison with the actual shape.

The heating element 21 has a heating section 210 and connection sections 211 and 212.

Figure 5:
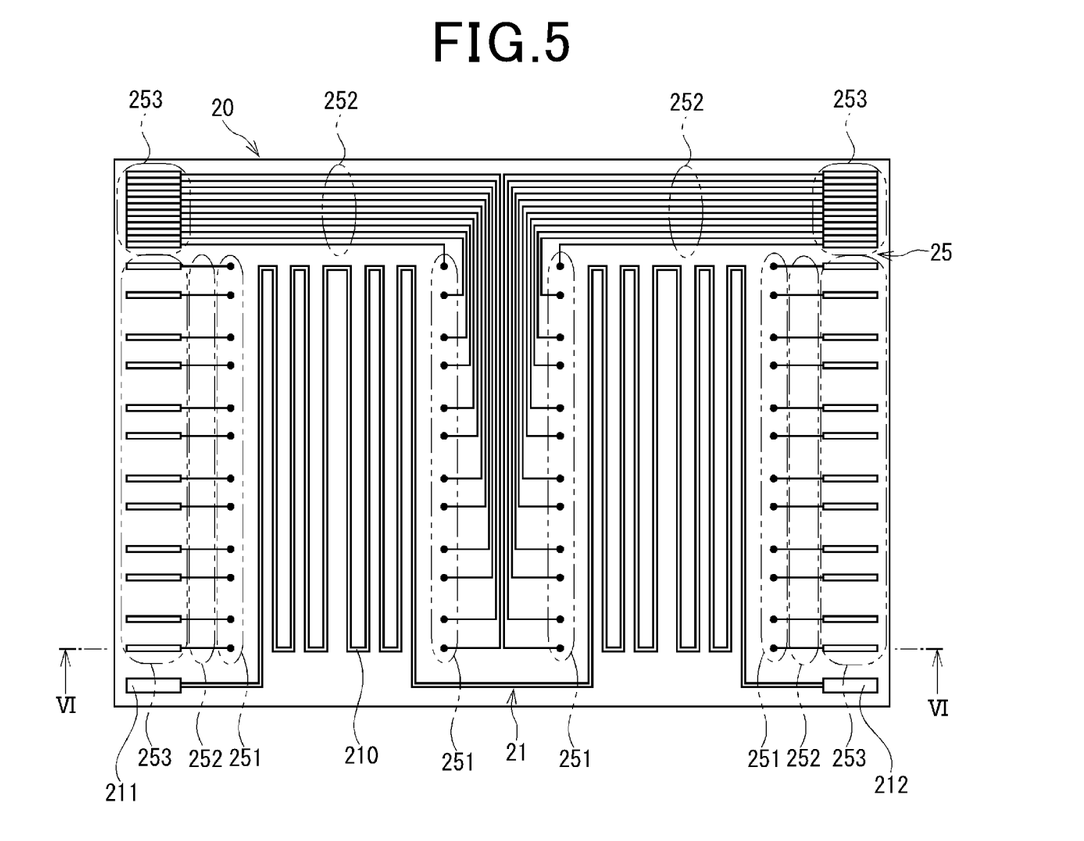
FIG. 5 is a schematic view of a heater plate which the inspection apparatus according to the embodiment of the present invention includes.

The heating section 210 is formed, for example, of stainless steel having a thickness of about 50 μm. As shown in FIG. 5, the heating section 210 is formed to meander on a plane. The heating section 210 generates heat upon being energized.

The connection sections 211 and 212 are respectively provided at two ends of the heating section 210. The connection sections 211 and 212 are connected to an external power source which is not shown in the figures.

The insulating portions 22 are formed, for example, of polyether imide (PEI) which has excellent insulation properties and high flowability at a predetermined temperature. The insulating portions 22 are located on the same plane as the heating element 21. The insulating portions 22 are formed in gaps between adjacent portions of the heating element 21 that is formed to meander on the plane, thereby maintaining insulation between these adjacent portions. Hereinafter, for the sake of convenience, the sheet-like member constituted of the heating element 21 and the insulating portions 22 will be referred to as sheet-like heating member 200.

The protective films 23 and 24 are formed, for example, of polyether ether ketone (PEEK). The protective films 23 and 24 are formed so as to cover the sheet-like heating member 200. The protective film 23 is provided on the side of one major surface 201 of the sheet-like heating member 200. The protective film 24 is provided on the side of the other major surface 202 of the sheet-like heating member 200. The protective films 23 and 24 protect the sheet-like heating member 200 from external forces.

The output circuit section 25 is provided on a surface 231 of the protective film 23 on the opposite side to the sheet-like heating member 200. The output circuit section 25 has a plurality of protruding portions 251, a plurality of wiring portions 252 and a plurality of external output portions 253. The output circuit section 25 is formed by patterning a single sheet of metal.

The protruding portions 251 are formed to be capable of respectively abutting the terminals 141 and 151 of the heat flux sensors 10 formed in the sensor sheet 8. The protruding portions 251 protrude in the direction opposite to the sheet-like heating member 200. In the present embodiment, there are formed 48 protruding portions 251 with respect to the 24 heat flux sensors 10 formed in the sensor sheet 8.

The wiring portions 252, the number of which is equal to the number of the protruding portions 251, are formed to be respectively electrically connected to the protruding portions 251. Specifically, in the present embodiment, 48 wiring portions 252 are formed with respect to the sensor sheet 8. The wiring portions 252 are formed in the shape of a thin film on the surface 231 of the protective film 23. Moreover, the wiring portions 252 are formed so as to extend from the protruding portions 251 toward the outer periphery of the heater plate 20. At ends of the wiring portions 252 on the opposite side to the protruding portions 251, there are respectively provided the external output portions 253.

The external output portions 253, the number of which is equal to the number of the wiring portions 252, are formed to be respectively electrically connected to the wiring portions 252. Specifically, in the present embodiment, 48 external output portions 253 are formed with respect to the sensor sheet 8. The external output portions 253 are each electrically connected to the characteristic measuring section 60. The external output portions 253 are capable of outputting to the characteristic measuring section 60 the voltages which are outputted by the heat flux sensors 10 and inputted to the protruding portions 251.

The protruding portion forming film 26 is provided between the protective film 23 and the sheet-like heating member 200. The protruding portion forming film 26 is formed of a material which has higher flowability at a predetermined temperature than the material of the protective film 23, such as PEI. The protruding portion forming film 26 has protrusions 261 formed at positions corresponding to the protruding portions 251 of the output circuit section 25.

As shown in FIG. 1, the cooling section 40 is provided on the opposite side of the sensor sheet 8 to the heater plate 20. The cooling section 40 is configured to be capable of regulating the temperature on the opposite side of the sensor sheet 8 to the heater plate 20 based on a command of the temperature controlling section 50.

The temperature detecting section 45 is configured to be capable of detecting the temperature on the opposite side of the heater plate 20 to the sensor sheet 8. In the present embodiment, the temperature detecting section 45 includes a heater support 46, a sheet support 47, a heat flux detecting sheet 9 and a temperature calculating section 48.

The heater support 46 is provided on the opposite side of the heater plate 20 to the sensor sheet 8. The heater support 46 supports the heater plate 20.

The sheet support 47 supports the heat flux detecting sheet 9 between it and the heater support 46.

The heat flux detecting sheet 9 is a sensor sheet which is manufactured in the same lot as the sensor sheet 8 whose characteristics are inspected by the inspection apparatus 1. The heat flux detecting sheet 9 detects the magnitude of the heat quantity flowing from the heater plate 20 to the sheet support 47. The heat flux detecting sheet 9 outputs a voltage according to the magnitude of the heat quantity; the voltage is outputted to the temperature calculating section 48.

The temperature calculating section 48 calculates, based on the voltage outputted by the heat flux detecting sheet 9, the magnitude of the heat quantity flowing from the heater plate 20 to the opposite side to the sensor sheet 8. The temperature calculating section 48 outputs a signal in accordance with the calculated magnitude of the heat quantity to the temperature controlling section 50.

The temperature controlling section 50 is electrically connected with the heater plate 20, the cooling section 40 and the temperature detecting section 45. To the temperature controlling section 50, there is inputted the signal outputted by the temperature detecting section 45. Based on the signal, the temperature controlling section 50 controls both the degree of heating by the heating plate 20 and the degree of cooling by the cooling section 40.

In the inspection apparatus 1, the temperature controlling section 50 controls the heater plate 20 and the cooling section 40 to have the magnitude of the heat quantity flowing from the heater plate 20 to the opposite side to the sensor sheet 8 equal to 0, i.e., to have the temperature of the temperature detecting section 45 equal to the temperature of the environment where the inspection apparatus 1 is placed. Consequently, all of the heat generated in the heater plate 20 can be considered as flowing to the cooling section 40 via the heat flux sensors 10; thus it is possible to accurately calculate the magnitude of the heat flow through the heat flux sensors 10 based on the voltage applied to the heating element 21 of the heater plate 20.

The characteristic measuring section 60 is electrically connected with the sensor sheet 8. The characteristic measuring section 60 derives, based on the signals outputted by the sensor sheet 8, the relationship between the magnitude of the heat flux and the outputted voltage for each of the heat flux sensors 10 formed in the sensor sheet 8. The derived results represent the characteristics of the heat flux sensors 10.

Next, a manufacturing apparatus and a manufacturing method of the heater plate 20 will be described.

Figure 8:
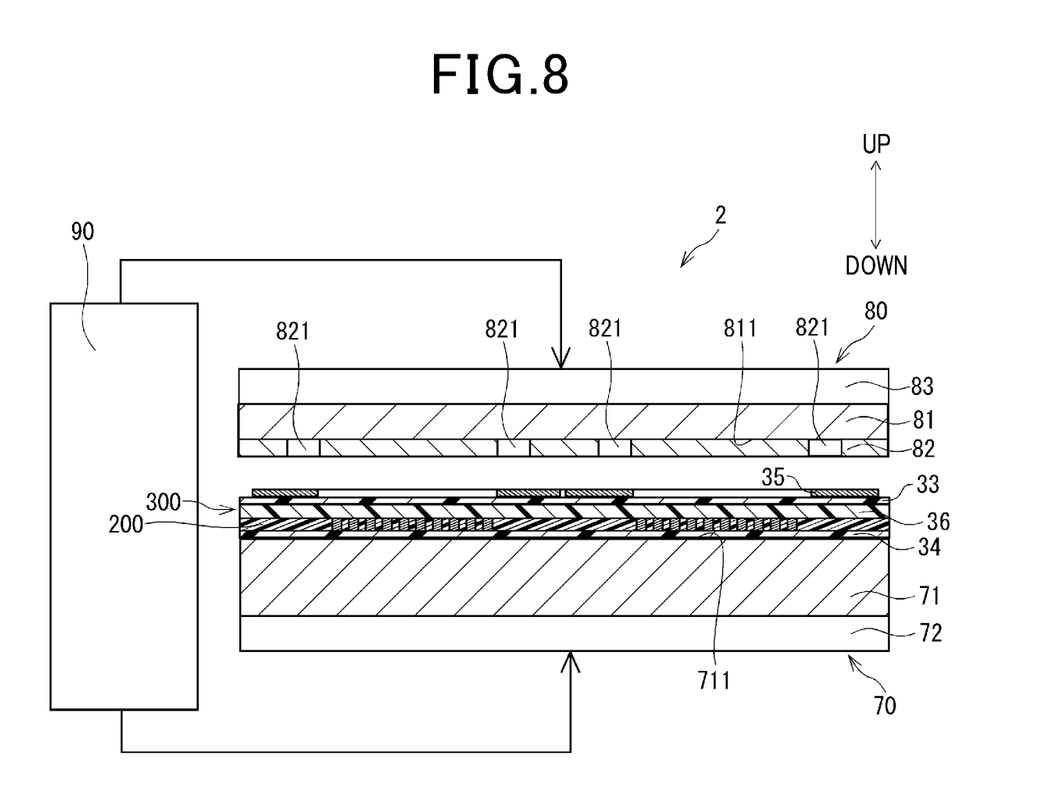
FIG. 8 is a schematic view of a manufacturing apparatus for the heater plate according to the embodiment of the present invention.

First, a heater plate manufacturing apparatus 2 will be described with reference to FIG. 8. FIG. 8 is a schematic view illustrating a state of the heater plate manufacturing apparatus 2 before pressing the plurality of members constituting the heater plate 20. The heater plate manufacturing apparatus 2 includes a press table 70, a press member 80 which corresponds to a "protruding portion forming press member", a drive section 90 and the like. In addition, in FIG. 8, there are indicated the "upper" side and the "lower" side in the vertical direction of the heater plate manufacturing apparatus 2.

The press table 70 is provided on the lower side of the heater plate manufacturing apparatus 2. The press table 70 is constituted of a press table main body 71 and a heater 72.

The press table main body 71 is formed to be capable of allowing a lower resin film 34 forming the protective film 24 of the heater plate 20, the sheet-like heating member 200, a flow film 36 forming the protruding portion forming film 26 of the heater plate 20, an upper resin film 33 which corresponds to a "coating film" forming the protective film 23 of the heater plate 20, and a metal sheet 35 forming the output circuit section 25 of the heater plate 20 to be sequentially placed in this order on an upper surface 711 of the press table main body 71. Hereinafter, for the sake of convenience, the laminate of the lower resin film 34, the sheet-like heating member 200, the flow film 36, the upper resin film 33 and the metal sheet 35 placed on the press table main body 71 will be referred to as heater plate forming laminate 300.

The heater 72 is provided on the opposite side of the press table main body 71 to the heater plate forming laminate 300. The heater 72 is configured to be capable of heating the heater plate forming laminate 300 via the press table main body 71. In the heater 72, there is provided a temperature sensor which is not shown in the figures; the temperature of the heater 72 is controlled based on the detection results of the temperature sensor.

The press member 80 is provided so as to be reciprocable in the vertical direction with respect to the press table 70. The press member 80 is constituted of a press main body 81, a processing portion 82 and a heater 83.

The press main body 81 is formed of a material which has a size capable of pressing the entire heater plate forming laminate 300 and whose thermal conductivity is relatively high.

The processing portion 82 is provided on a surface 811 of the press main body 81 on the press table 70 side. As shown in FIG. 8, the processing portion 82 has a plurality of through-holes at predetermined positions. The processing portion 82 is formed separately from the press main body 81, and assembled to the press main body 81 after forming the through-holes at the predetermined positions by laser beam machining, etching or the like. Consequently, the through-holes constitute recesses 821 on the heater plate forming laminate 300 side of the press member 80.

The heater 83 is provided on the opposite side of the press main body 81 to the heater plate forming laminate 300. The heater 83 is configured to be capable of heating the processing portion 82 via the press main body 81. In the heater 83, there is provided a temperature sensor which is not shown in the figures; the temperature of the heater 83 is controlled based on the detection results of the temperature sensor.

The drive section 90 is connected with both the press table 70 and the press member 80. The drive section 90 is configured to generate a driving force capable of driving the press member 80 with respect to the press table 70 and transmit the driving force to the press member 80. Moreover, the drive section 90 is capable of supplying the heaters 72 and 83 with electric power for generating heat.

Figure 9:
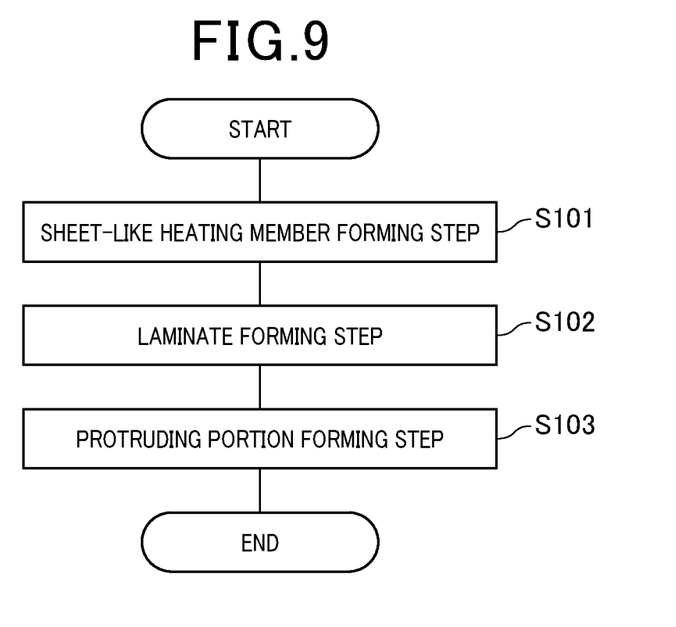
FIG. 9 is a flow chart illustrating a manufacturing method of the heater plate according to the embodiment of the present invention.
Figure 10A:
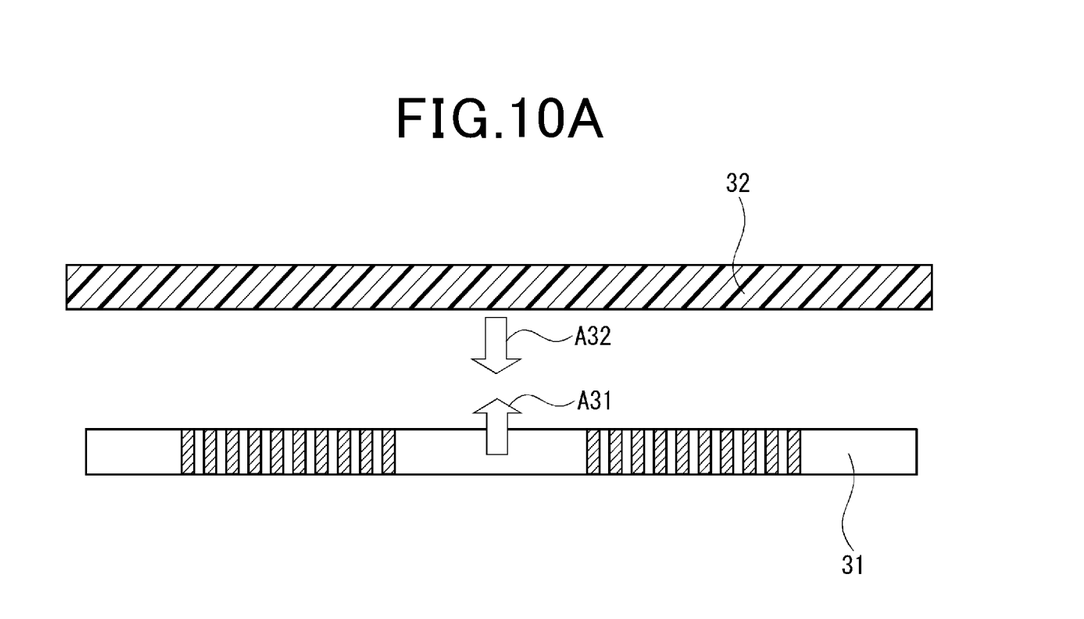
FIG. 10A is a schematic view illustrating a sheet-like heating member forming step of the manufacturing method of the heater plate according to the embodiment of the present invention.
Figure 10B:
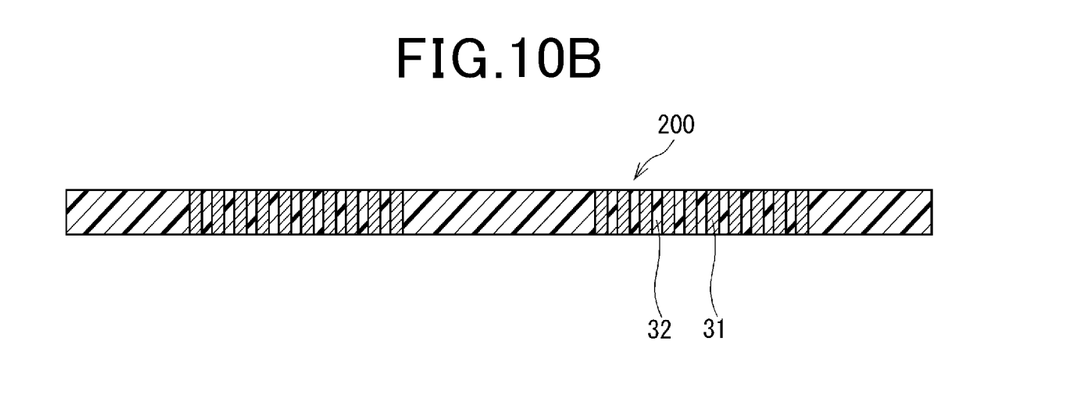
FIG. 10B is another schematic view illustrating the sheet-like heating member forming step of the manufacturing method of the heater plate according to the embodiment of the present invention.
Figure 11:
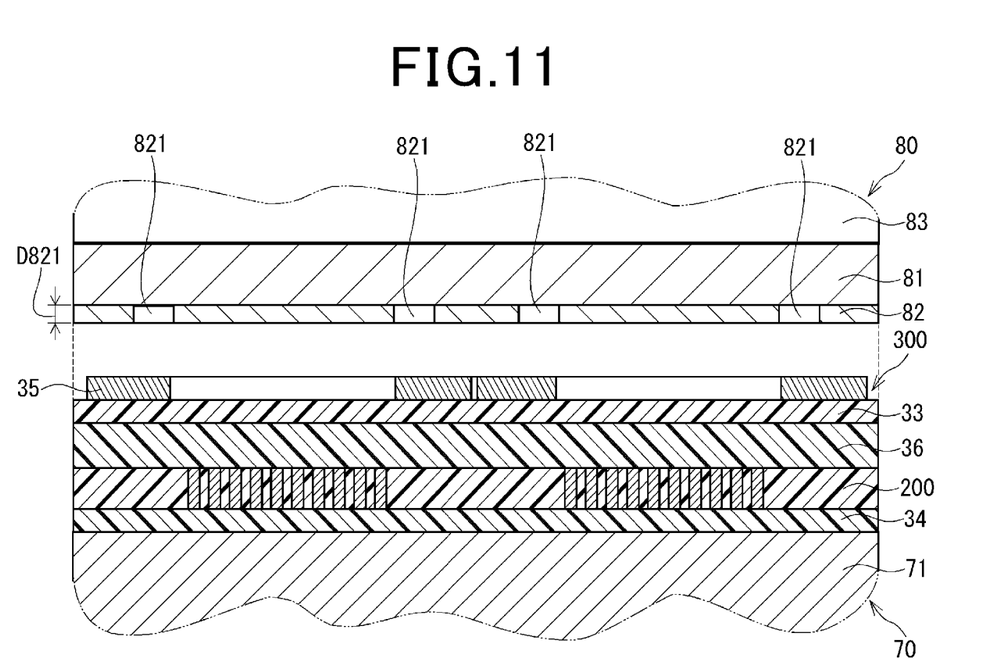
FIG. 11 is a schematic view illustrating a laminate forming step of the manufacturing method of the heater plate according to the embodiment of the present invention.
Figure 12:
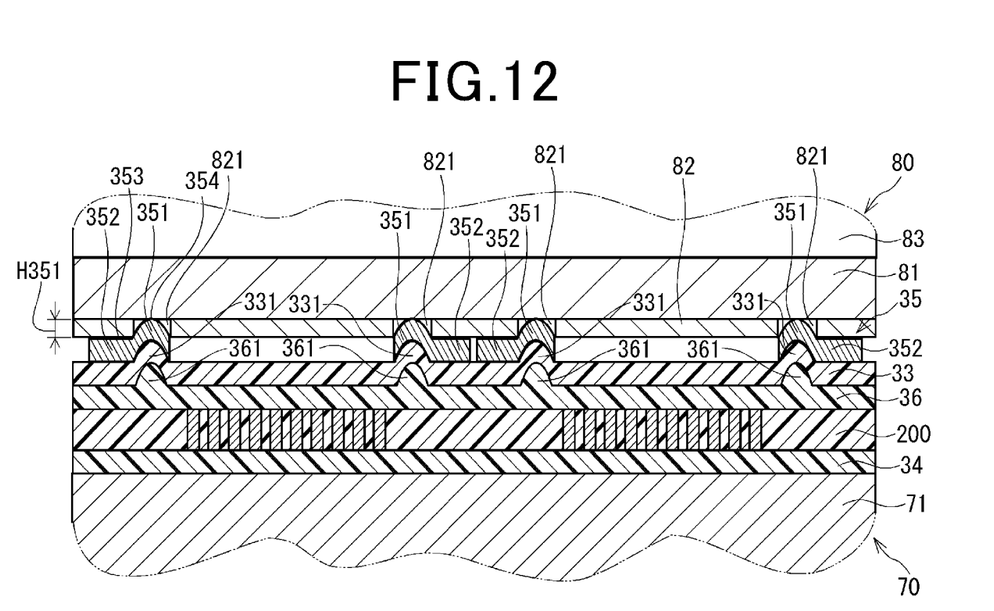
FIG. 12 is a schematic view illustrating a protruding portion forming step of the manufacturing method of the heater plate according to the embodiment of the present invention.

Next, the method of manufacturing the heater plate 20 using the heater plate manufacturing apparatus 2 will be described with reference to FIGS. 9-12. FIG. 9 shows steps of the method of manufacturing the heater plate 20. FIGS. 10-12 show cross-sectional views of the members constituting the heater plate 20 at each of the steps of the method of manufacturing the heater plate 20. In addition, in FIGS. 10-12, for facilitating understanding of the configuration of the heater plate forming laminate 300, the aspect ratio is changed in comparison with the actual shape.

First, in a sheet-like heating member forming step S101, the sheet-like heating member 200 is formed. Specifically, as shown in FIG. 10A, a filament-like heating element 31 and a sheet-like insulating member 32, which are prepared separately, are brought into contact with each other in the directions of white arrows A31 and A32 while being heated. The heating element 31 is a filament-like member which is formed of stainless steel to meander on a plane; the heating element 31 constitutes the heating element 21 of the heater plate 20. Moreover, the insulating member 32 is formed of PEI; the insulating member 32 constitutes the insulating portions 22 of the heater plate 20. The insulating member 32, which is brought into a flowable state by heating, enters the gaps between adjacent portions of the heating element 31. Consequently, the single sheet-like heating member 200 is formed as shown in FIG. 10B.

Next, in a laminate forming step S102, as shown in FIG. 11, the lower resin film 34, the sheet-like heating member 200 formed in the step S101, the flow film 36, the upper resin film 33 and the metal sheet 35 are sequentially placed in this order on the upper surface 711 of the press table 70.

The lower resin film 34 is formed of PEEK into the shape of a flat plate. The lower resin film 34 will constitute the protective film 24 of the heater plate 20.

The flow film 36 is provided between the sheet-like heating member 200 and the upper resin film 33. The flow film 36 is formed of PEI, which has higher flowability at the predetermined temperature than the upper resin film 33, into the shape of a flat plate. The flow film 36 will constitute the protruding portion forming film 26 of the heater plate 20.

The upper resin film 33 is formed of PEEK into the shape of a flat plate. The upper resin film 33 is provided so as to cover the flow film 36. The upper resin film 33 will constitute the protective film 23 of the heater plate 20.

The metal sheet 35 is provided on the opposite side of the upper resin film 33 to the sheet-like heating member 200. The metal sheet 35 is formed of a metal that is patterned so as to form a circuit on the upper resin film 33. The metal sheet 35 will constitute the output circuit section 25 of the heater plate 20.

Next, in a protruding portion forming step S103, by the press table 70 and the press member 80, the heater plate forming laminate 300 is pressed while being heated. Specifically, the heater plate forming laminate 300 is pressed from both sides thereof under a pressure of, for example, 6 MPa with the temperatures of the press table 70 and the press member 80 kept by the respective temperature sensors at a predetermined temperature, e.g., 230 degrees.

Upon the heater plate forming laminate 300 being heated by the press table 70 and the press member 80 to 230 degrees, the flow film 36 is caused to have flowability. At this time, part of the flow film 36 sandwiched between the sheet-like heating member 200 and the upper resin film 33 moves, by the pressure under which the heater plate forming laminate 300 is pressed, to the recesses 821 of the press member 80. Consequently, as shown in FIG. 12, those portions of the flow film 36 which respectively correspond to the recesses 821 form protrusions 361 that protrude toward the press member 80 side. With the protrusions 361 protruding toward the press member 80 side, those portions 331 of the upper resin film 33 which are respectively on the protrusions 361 and those portions 351 of the metal sheet 35 which respectively correspond to the portions 331 of the upper resin film 33 are extruded to protrude toward the press member 80 side. In addition, the protruding portions 351 of the metal sheet 35 are formed so that the height H351 from the press member 80-side surfaces 353 of non-protruding portions 352 of the metal sheet 35 to the press main body 81-side vertexes 354 of the protruding portions 351 is substantially equal to the depth D821 (see FIG. 11) of the recesses 821 of the press member 80. Consequently, the protruding portions 351 of the metal sheet 35 have a substantially semicircular cross-sectional shape.

As above, in the present embodiment, the protruding portions 351 are formed in the metal sheet 35 by pressing the heater plate forming laminate 300 while heating the same. Consequently, the heater plate 20 is manufactured which has the protective film 24 constituted of the lower resin film 34, the protruding portion forming film 26 constituted of the flow film 36, the protective film 23 constituted of the upper resin film 33 and the protruding portions 251 of the output circuit section 25 constituted of the protruding portions 351 of the metal sheet 35.

In the heater plate 20, the protruding portion forming film 26, which is provided between the protective film 23 and the sheet-like heating member 200, has the protrusions 261 formed at the positions corresponding to the protruding portions 251 of the output circuit section 25. Consequently, those portions of the protective film 23 and those portions of the output circuit section 25 which correspond to the positions of the protrusions 261 protrude, forming the protruding portions 251. Since the protruding portions 251 can be formed into a desired shape by forming the protrusions 261 into a desired shape, it is possible to ensure electrical connection between the terminals 141 and 151 of the heat flux sensors 10 and the protruding portions 251. Moreover, the heating element 21, which heats the heat flux sensors 10, is formed integrally with the output circuit section 25 that has the protruding portions 251; therefore, by adhering the heater plate 20 to the heat flux sensors 10, it is possible to reliably bring the protruding portions 251 into abutment with the terminals 141 and 151 while reliably transferring the heat generated by the heating element 21 to the heat flux sensors 10. Accordingly, the heater plate 20 can reliably externally output the signals outputted by the terminals 141 and 151 while supplying a predetermined heat quantity to the heat flux sensors 10.

In the heater plate 20, the protruding portion forming film 26, which has the protrusions 261 for forming the protruding portions 251, is formed of PEI whose flowability at 230 degrees which is the "predetermined temperature" is higher than the flowability of the protective film 23 at the same temperature. Consequently, in manufacturing the heater plate 20, it is possible to relatively easily form the protrusions 261 into a desired shape. Accordingly, it is possible to reliably externally output the signals outputted by the terminals 141 and 151 by forming the protruding portions 251 to have a height at which the protruding portions 251 can be reliably brought into contact with the terminals 141 and 151.

Moreover, in the manufacturing method of the heater plate 20 according to the present embodiment, the press member 80, which has the recesses 821 at the positions corresponding to the protruding portions 251, is used to press the heater plate forming laminate 300 while heating the same. Consequently, of the flow film 36 that is caused by heating to have flowability, those portions which correspond to the recesses 821 move into the recesses 821, forming the protrusions 361. Moreover, with formation of the protrusions 361, those portions 331 of the upper resin film 33 which respectively correspond to the protrusions 361 and those portions 351 of the metal sheet 35 which respectively correspond to the portions 331 of the upper resin film 33 protrude to form the protruding portions 251 of the heater plate 20. Therefore, it is possible to accurately adjust the height H351 of the protruding portions 251 to a desired height by adjusting the depth D821 of the recesses 821 when machining the recesses 821. Consequently, it is possible to manufacture the heater plate 20 which has the protrusions 251 capable of reliably abutting the terminals 141 and 151 of the heat flux sensors 10.

Moreover, in the heater plate manufacturing apparatus 2, the processing portion 82 constituting the press member 80 is formed separately from the press main body 81. The through-holes formed in the processing portion 82 constitute the recesses 821 for forming the protruding portions 251; therefore, it is possible to improve the machining accuracy of the recesses 821. Accordingly, it is possible to accurately set the height H351 of the protruding portions 351 of the metal sheet 35 which represents the height of the protruding portions 251 in the heater plate 20.

Other Embodiments

In the above-described embodiment, the heater plate is employed in the apparatus for inspecting the characteristics of the heat flux sensors that are formed in a sheet-like shape. However, the heater plate may also be applied to other apparatuses that inspect a sheet-like inspection object, which has terminals capable of outputting a signal, by externally outputting the signal outputted by the terminals while heating the inspection object.

Figure 13:
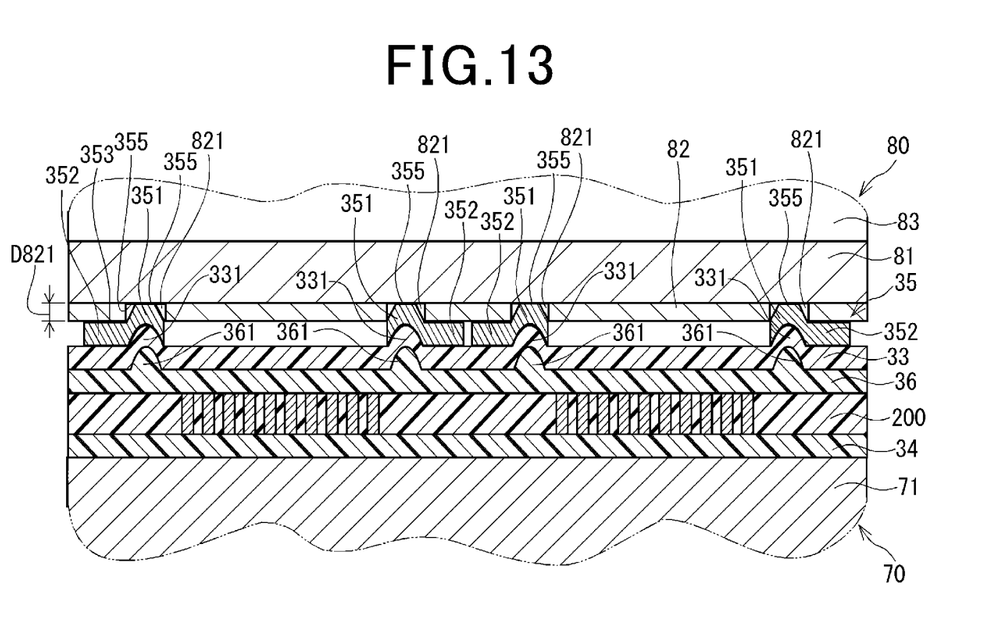
FIG. 13 is a schematic view illustrating a manufacturing method of a heater plate according to another embodiment of the present invention.

In the above-described embodiment, when the heater plate forming laminate is pressed by the press table and the press member, the protruding portions of the metal sheet are formed so that the height from the press member-side surfaces of the non-protruding portions of the metal sheet to the press main body-side vertexes of the protruding portions is substantially equal to the depth of the recesses of the press member. However, the metal sheet may alternatively be pressed so that the protruding portions thereof protrude more than the depth of the recesses. In this case, as shown in FIG. 13, the protruding portions 351 of the metal sheet 35 respectively abut the bottom surfaces 822 of the recesses 821; thus the protruding portions 351 are each formed to have a relatively flat abutting surface 355 on the press main body 81 side. That is, the shape of the protruding portions 251 may be changed by changing the depth D821 of the recesses 821 of the press member 80. For example, setting the depth D821 to be relatively large, as shown in FIG. 12 of the above-described embodiment, the tips of the protruding portions 351 of the metal sheet 35 have a curved cross-sectional shape. Moreover, as shown in FIG. 13, setting the depth D821 to be relatively small, the protruding portions 351 of the metal sheet 35 are formed to respectively have the relatively flat abutting surfaces 355. When the protruding portions 351 of the metal sheet 35 are formed to respectively have the flat abutting surfaces 355, it is possible to more reliably bring the output circuit section 25 into contact with the terminals 141 and 151 of the heat flux sensors 10.

In the above-described embodiment, the heat flux sensors have the configuration as shown in FIG. 4. However, the configuration of the heat flux sensors is not limited to it.

In the above-described embodiment, the protruding portion forming film of the heater plate is formed of PEI while the protective films of the heater plate are formed of PEEK. However, materials for forming the protruding portion forming film and the protective films are not limited to the above materials. Moreover, though it is preferable that the protruding portion forming film has higher flowability at the predetermined temperature than the protective films, materials for forming the protruding portion forming film and the protective films do not necessarily satisfy the above condition.

In the above-described embodiment, in pressing the heater plate forming laminate while heating the same, the heater plate forming laminate is pressed under the pressure of 6 MPa while the press table and the press member are heated to 230 degrees. However, the temperature of heating the heater plate forming laminate and the pressure are not limited to the above values. The temperature may be any temperature at which the flow film is flowable whereas the upper resin film is not flowable. Moreover, the pressure may be any pressure under which the flow film in a flowable state can move into the recesses.

In the above-described embodiment, the heater plate has, on the opposite side of the sheet-like heating member to the output circuit section, the protective film for protecting the sheet-like heating member. However, the protective film on the opposite side of the sheet-like heating member to the output circuit section may be omitted.

In the above-described embodiment, the heater of the press table of the heater plate manufacturing apparatus is provided on the opposite side of the press table main body to the heater plate forming laminate. Moreover, the heater of the press member is provided on the opposite side of the press main body to the heater plate forming laminate. However, the positional relationship between the press table main body and the heater of the press table and the positional relationship between the press main body and the heater of the press member are not limited to the above arrangement.

In the above-described embodiment, the sheet-like heating member is constituted of the heating element formed to meander on a plane and the insulating portions formed in the gaps between adjacent portions of the heating element to maintain insulation between the adjacent portions. However, the constitution of the sheet-like heating member is not limited to the above.

In the above-described embodiment, the temperature detecting section calculates the magnitude of the heat flow from the heater plate to the opposite side to the sensor sheet using a sensor sheet which is manufactured in the same lot as the sensor sheet whose characteristics are inspected by the inspection apparatus. However, the configuration of the temperature detecting section is not limited to the above. The temperature detecting section may alternatively detect a temperature using a thermocouple.

In the above-described embodiment, the processing portion constituting the press member is formed separately from the press main body. However, the processing portion may alternatively be formed integrally with the press main body into one piece.

As above, the present invention is not limited to the above-described embodiment and can be implemented in various modes without departing from the spirit of the invention.

DESCRIPTION OF REFERENCE SIGNS

20: heater plate
23: protective film
25: output circuit section
26: protruding portion forming film
200: sheet-like heating member
251: protruding portions
253: external output portions
261: protrusions

What is claimed is:

1. A heater plate capable of, while heating a sheet-like inspection object that has terminals capable of outputting a signal, externally outputting the signal outputted by the terminals,
the heater plate comprising:
a sheet-like heating member that generates heat upon being energized;
a protective film provided on the side of one major surface of the sheet-like heating member to protect the sheet-like heating member;
an output circuit section provided on a surface of the protective film on an opposite side to the sheet-like heating member, the output circuit section having protruding portions and external output portions, the protruding portions protruding in a direction opposite to the sheet-like heating member so as to be capable of abutting the terminals respectively, the external output portions being respectively electrically connected with the protruding portions and capable of externally outputting the signal that is inputted to the protruding portions; and
a protruding portion forming film provided between the protective film and the sheet-like heating member, the protruding portion forming film having protrusions formed at positions corresponding to the protruding portions,
wherein
the sheet-like heating member, the protective film, the output circuit section and the protruding portion forming film are integrally formed into one piece.

2. The heater plate as set forth in claim 1, wherein flowability of the protruding portion forming film at a predetermined temperature is higher than flowability of the protective film at the predetermined temperature.

3. The heater plate as set forth in claim 1, wherein the sheet-like heating member includes a filament-like heating element formed on a plane and insulating portions formed in gaps between adjacent portions of the heating element to maintain insulation between the adjacent portions.

4. The heater plate as set forth in claim 1, wherein the protruding portions have respective abutting surfaces formed in a planar shape and being capable of abutting the terminals respectively.

5. An apparatus for manufacturing a heat flux sensor, the apparatus comprising: the heater plate as set forth in claim 1 and capable of allowing a heat flux sensor as the inspection object to be placed on a side where the protruding portions protrude;
a temperature regulating section provided on an opposite side of the heat flux sensor to the heater plate and capable of regulating temperature on the opposite side of the heat flux sensor to the heater plate;
a temperature detecting section provided on an opposite side of the heater plate to the heat flux sensor, the temperature detecting section being configured to detect temperature on the opposite side of the heater plate to the heat flux sensor and externally output a signal based on the detected temperature;
a temperature controlling section electrically connected with the heater plate, the temperature detecting section and the temperature regulating section, the temperature controlling section being configured to control, based on the temperature on the opposite side of the heater plate to the heat flux sensor which is outputted by the temperature detecting section, electric power supplied to the heater plate and operation of the temperature regulating section; and
a characteristic measuring section electrically connected with the output circuit section and configured to measure characteristics of the heat flux sensor based on the signal outputted by the output circuit section.

6. A method of manufacturing a heater plate, the heater plate being capable of, while heating a sheet-like inspection object that has terminals capable of outputting a signal, externally outputting the signal outputted by the terminals, the method comprising:

a laminate forming step for forming a heater plate forming laminate by laminating a sheet-like heating member, a flow film, a coating film and a metal sheet in this order, the sheet-like heating member generating heat upon being energized, the flow film having flowability at a predetermined temperature, the coating film being formed of a material which has lower flowability at the predetermined temperature than the flow film and capable of covering an opposite side of the flow film to the sheet-like heating member, the metal sheet capable of forming an output circuit section that has protruding portions and external output portions, the protruding portions protruding in a direction opposite to the sheet-like heating member so as to be capable of abutting the terminals respectively, the external output portions being respectively electrically connected with the protruding portions and capable of externally outputting the signal that is inputted to the protruding portions; and a protruding portion forming step for forming the protruding portions of the output circuit section by causing, after the laminate forming step, a protruding portion forming press member, which has recesses, to abut a surface of the heater plate forming laminate on a side where the metal sheet is provided, pressing the heater plate forming laminate while heating it to the predetermined temperature and thereby shaping portions of the flow film corresponding to the recesses into protrusions that protrude toward the recesses, and causing portions of the coating film corresponding to the protrusions and portions of the metal sheet corresponding to the protrusions to protrude in the opposite direction to the sheet-like heating member.

7. The method of manufacturing a heater plate as set forth in claim 6, further comprising, before the laminate forming step, a sheet-like heating member forming step for forming the sheet-like heating member by heating a filament-like heating element and an insulating member while causing them to abut each other, the heating element being formed along a plane, the insulating member being arrangeable in gaps between adjacent portions of the heating element.

8. An apparatus for manufacturing a heater plate, the heater plate being capable of, while heating a sheet-like inspection object that has terminals capable of outputting a signal, externally outputting the signal outputted by the terminals, the apparatus comprising:

a press table capable of allowing a heater plate forming laminate to be placed thereon, the heater plate forming laminate being formed of a sheet-like heating member, a flow film, a coating film and a metal sheet, the sheet-like heating member generating heat upon being energized, the flow film having flowability at a predetermined temperature, the coating film being formed of a material which has lower flowability at the predetermined temperature than the flow film and capable of covering an opposite side of the flow film to the sheet-like heating member, the metal sheet capable of forming an output circuit section that has protruding portions and external output portions, the protruding portions protruding in a direction opposite to the sheet-like heating member so as to be capable of abutting the terminals respectively, the external output portions being respectively electrically connected with the protruding portions and capable of externally outputting the signal that is inputted to the protruding portions;

a protruding portion forming press member provided so as to be relatively movable with respect to the press table, the protruding portion forming press member being capable of clamping the heater plate forming laminate between it and the press table and thereby forming the protruding portions of the output circuit section; and a drive section capable of driving at least one of the press table and the protruding portion forming press member, wherein the protruding portion forming press member is provided on a side of the heater plate forming laminate where the metal sheet is provided, and has recesses at positions corresponding to the protruding portions, and the at least one of the press table and the protruding portion forming press member is capable of heating the heater plate forming laminate while clamping the heater plate forming laminate between the press table and the protruding portion forming press member.

9. The apparatus for manufacturing a heater plate as set forth in claim 8, wherein the protruding portion forming press member has a press main body capable of pressing the entire metal sheet and a processing portion provided on one surface of the press main body and having through-holes, and the press main body and the processing portion are separately formed.

\* \* \* \* \*